US011438192B2

(12) United States Patent
Weinstein

(10) Patent No.: US 11,438,192 B2
(45) Date of Patent: Sep. 6, 2022

(54) MANAGED SWITCH WITH PHYSICALLY DISTRIBUTED PORTS

(71) Applicant: William W. Weinstein, Belmont, MA (US)

(72) Inventor: William W. Weinstein, Belmont, MA (US)

(\*) Notice: Subject to any disclaimer, the term of this patent is extended or adjusted under 35 U.S.C. 154(b) by 0 days.

(21) Appl. No.: 17/321,779

(22) Filed: May 17, 2021

(65) Prior Publication Data

US 2021/0359876 A1 Nov. 18, 2021

Related U.S. Application Data

(60) Provisional application No. 63/026,100, filed on May 17, 2020.

(51) Int. Cl.
*H04L 12/413* (2006.01)
*H04L 12/40* (2006.01)
*H04L 12/54* (2022.01)
*H04L 12/70* (2013.01)

(52) U.S. Cl.
CPC ...... *H04L 12/413* (2013.01); *H04L 12/40071* (2013.01); *H04L 12/5601* (2013.01); *H04L 2012/5612* (2013.01); *H04L 2012/5624* (2013.01); *H04L 2012/5684* (2013.01)

(58) Field of Classification Search
CPC ..... H04L 2012/5612; H04L 2012/5624; H04L 2012/5684; H04L 12/413; H04L 12/40071; H04L 12/5601
See application file for complete search history.

(56) References Cited

U.S. PATENT DOCUMENTS

| 7,233,592 B1 * | 6/2007 | Oi ........................ H04L 12/6418 709/236 |
| 7,778,205 B2 * | 8/2010 | Florit ...................... H04L 45/48 370/256 |
| 8,553,534 B2 * | 10/2013 | Allasia ................ H04L 41/0654 398/4 |

(Continued)

OTHER PUBLICATIONS

Fratta et al., Tokenless Protocols for Fiber Optic Local Area Networks, IEEE Journal on Selected Areas in Communications, vol. SEC-3, No. 6, Nov. 1985, pp. 928-940.

(Continued)

*Primary Examiner* — Rasheed Gidado
(74) *Attorney, Agent, or Firm* — Lathrop GPM LLP

(57) ABSTRACT

A ring-based switch has nodes with a link management logic having forward and reverse link outputs couplable to other nodes, forward and reverse link inputs adapted couplable to other nodes, and memory coupled to the link management logic. The link management logic has a first mode where packet bursts are received through the forward link input and transmitted on its forward link output. The link management logic has a second mode where packet bursts are received through the forward link input and transmitted on its reverse link output; and a third mode where packet bursts are received through the reverse link input and transmitted on its forward link output. The node transmits test packets over the forward link output and, if no acknowledgment is received over the reverse link input within a predetermined test-time interval, the link management logic configures in the second mode.

20 Claims, 11 Drawing Sheets

(56) References Cited

U.S. PATENT DOCUMENTS 10,666,378 B2 * 5/2020 Yuang ................ H04J 14/0205

OTHER PUBLICATIONS

Schaffa et al., A High Speed Access Protocol for LANs and WANs, 0-7803-0917-0/93$03.00, IEEE, 1993, pp. 1100-1104.
Abeysundara et al., Z-NET: A Dual Bus Fiber-Optic LAN Using Active and Passive Switches, CH2702-9/89/0000/0029$02.00, IEEE, 1989, pp. 19-27.
Baiocchi et al., The ACCI Access Protocol for a Twin Bus ATM Metropolitan Area Network, CH2826-5/90/0000/0265$01.00, IEEE, 1990, pp. 165-174.
Ghansah, et al., A Prioritized Reservation Protocol for Fiber Optic Ring Local Area Computer Networks, CH2613-8/88/0000/0410/$01.00 IEEE, 1988, pp. 410-420.
Sachs, Alternative Local Area Network Access Protocols, IEEE Communcations Magazine, vol. 26, No. 3, Mar. 1988, pp. 25-45.

* cited by examiner

| Functional Node Configuration | Path Through Link Logic (in Fig 4B) |
|---|---|
| Normal Forward Traffic | 108 -> 440 -> 442 -> 446 -> 448 -> 450 -> 109 or 444 -> 446 -> 448 -> 450 -> 109 |
| Normal Reverse Traffic | 110 -> 460 -> 462 -> 466 -> 468 -> 470 -> 111 or 464 -> 466 -> 468 -> 470 -> 111 |
| Loopback to Previous Node | 108 -> 440 -> 442 -> 446 -> 470 -> 111 |
| Loop Forward to Next Node | 110 -> 460 -> 462 -> 466 -> 450 -> 109 |
| Pass Through in Reverse Direction | 110 -> 460 -> 468 -> 470 -> 111 |
| Pass Through in Forward Direction | 108 -> 440 -> 448 -> 450 -> 109 |

| Node A | | | Node B | | |
|---|---|---|---|---|---|
| Sees reply from B | Sees test msg from B | Knows: | Sees reply from A | Sees test msg from A | Knows: |
| Yes | Yes | a, b & B OK | Yes | Yes | a, b & A OK |
| No | Yes | a Failed | No | Yes | b Failed |
| No | No | b or B Failed, a unknown | No | No | a or A Failed, b unknown |

MANAGED SWITCH WITH PHYSICALLY DISTRIBUTED PORTS

CLAIM TO PRIORITY

The present document claims priority to U.S. Provisional Patent Application 63/026,100 filed 17 May 2020. The entire contents of that provisional patent application are incorporated herein by reference.

FIELD OF THE INVENTION

The present invention is in the technical field of data communications. More particularly, the present invention is in the technical field of managed network switches.

SUMMARY OF THE INVENTION

The present invention provides the capabilities of a managed network switch, including the ability to support multiple simultaneous conversations between pairs of clients; to create multiple virtual private networks among clients; to support broadcast and multicast of data from one to many clients; and to support physical, data link, and network protocol translation between clients on different switch ports.

The logic of the switch is distributed among multiple nodes that are connected to each other in a topological ring via high-speed serial ports. The nodes can be physically located proximate to clients thus avoiding the need for a multitude of long point-to-point connections between clients and the switch. The serial links form the "fabric" of the switch. Unlike circular bus topologies such as Token Ring or FDDI, this system requires no token passing or other media access protocol. All the links move data synchronously in the same direction during predefined time intervals.

The invention behaves like a true switch, not a bus. However, because the ports of the switch can be physically distributed, it can be used to replace the multi-drop buses used in many real-time systems such as, but not limited to, the various data buses used in automobiles, in particular Controller Area Network (CAN) bus, Ethernet, Automotive Ethernet, and Universal Serial Bus (USB). These buses are generally insecure in the face of malicious attacks, and many, such as CAN, cannot incorporate security into their protocols in any practical way. The invention can provide a transparent replacement for these buses while providing all the security features of a managed switch, plus the ability to support protocol translation between clients. In particular, because the switch identifies clients by their physical port connection, it can prevent compromised clients from impersonating other clients. The invention also provides the ability to vet the integrity and authenticity of upgrades to client firmware—something that many extant clients cannot do now—and changes to the switch's own configuration tables.

In an embodiment, a ring-based switch has nodes with a link management logic having forward and reverse link outputs couplable to other nodes, forward and reverse link inputs couplable to other nodes, and memory coupled to the link management logic. The link management logic has a first mode where packet bursts are received through the forward link input and transmitted on its forward link output. The link management logic has a second mode where packet bursts are received through the forward link input and transmitted on its reverse link output; and a third mode where packet bursts are received through the reverse link input and transmitted on its forward link output. The node transmits test packets over the forward link output and, if no acknowledgment is received over the reverse link input within a predetermined test-time interval, the link management logic configures in the second mode. The node transmits test packets over the reverse link output and, if no acknowledgment is received over the forward link input within a predetermined test-time interval, the link management logic configures in the third mode. If the node receives acknowledgements on both the forward link input and the reverse link input within the predetermined test-time interval, the link management logic configures in the first mode.

DETAILED DESCRIPTION OF THE INVENTION

Switch Architecture

Figure 1A:
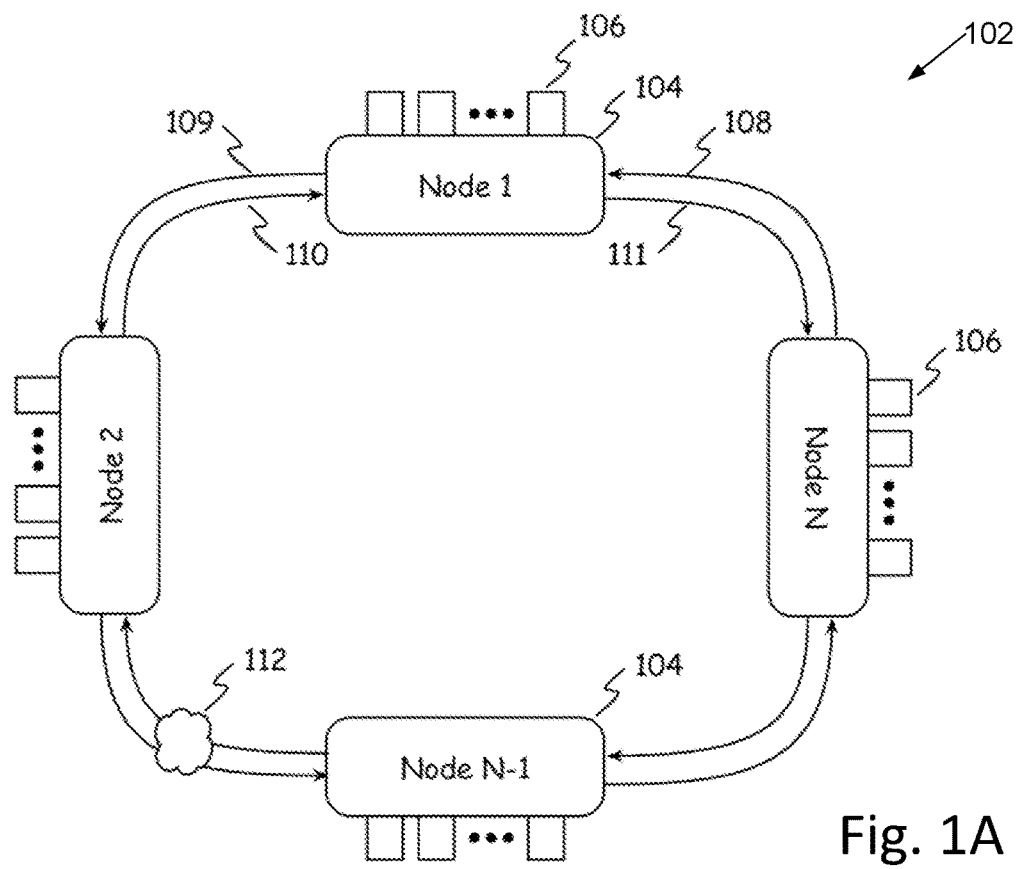
FIG. 1A is a block diagram illustrating top-level architecture of the switch.

Switch 102 (FIG. 1A) incorporates multiple switch nodes 104, each switch node 104 having one or more ports 106, and high-speed serial links, such as serial links 108, 109, 110 and 111, connecting the nodes. The switch 102 has N nodes; nodes Node 1, Node 2, Node N−1 and Node N are shown explicitly, additional N−4 nodes 112 may be present in switch 102.

Serial links 108, 109, 110, 111 may be optical, wireless, or wired links that may use optical fibers, coaxial cable, or unshielded or shielded twisted pair wires as known in the art of high-speed data transmission. If links 108, 109, 110, 111 are wired links they may use single-ended or differential receivers at the nodes.

Example Application of the Switch

The invention is particularly beneficial to the context of automobile data networks. But it is equally applicable to other contexts. Its applicability and potential benefits to any other contexts should not be construed as being limited in any way by the following discussion about the automobile context.

Automobiles currently have from 50 to 100 individual processors that perform functions that range from safety critical (e.g., anti-lock braking, traction control, automated cruise control), to infotainment (e.g., GPS, back seat video). Some automobiles even have wireless connections to services like On-Star and via connected cell phones, the Internet. Many of these functions utilize data networks to connect their various components. In the quest for greater functionality those data networks have increasingly become interconnected, such that any device in the automobile has a potential data path to any other device. Physical access to these data networks is available via an automobile's onboard diagnostics (OBD) port. Remote access is possible via the radio links to On-Star, connected cell phones, and even via the Bluetooth connection used by tire pressure monitors.

Given that most of the standard data networks in cars are inherently insecure (e.g. CAN bus) this raises potential for mischievous hacking. The ability to take control of an automobile has been demonstrated. Because of their architecture, there is no practical way to add security to these standard networks. Adding security to the devices on the networks would require a significant redesign of those devices. Some efforts have been made to insert firewalls between the various networks, but these are ad hoc fixes whose management further complicates an already complicated situation.

The switch provides a uniform, coherent mechanism for providing robust data security by reducing the multiplicity of networks and replacing them with a distributed switch which interfaces directly with the devices. The invention provides ability to create virtual private networks among arbitrary sets of devices, whether on the same node or different nodes. It also provides the ability for a node to vet the integrity and authenticity of firmware upgrade files for any of the devices connected to that or another node, including validating a digital signature.

The switch provides a communications structure usable on any automobile or aircraft, without modification to already extant devices such as sensors, actuators, controllers. This provides a pathway to designs using some extant devices until further development reworks devices to make them directly compatible. The switch reduces the complexity of the wiring in the vehicle and has the potential to reduce the total amount of wiring. The capacity of the distributed switch, using currently available automotive-grade components, is sufficient to support multiple vehicle control loops at rates above 100 Hz, as well as multiple video and audio streams from collision avoidance, backup, and dash cameras, and entertainment systems.

Figure 1B:
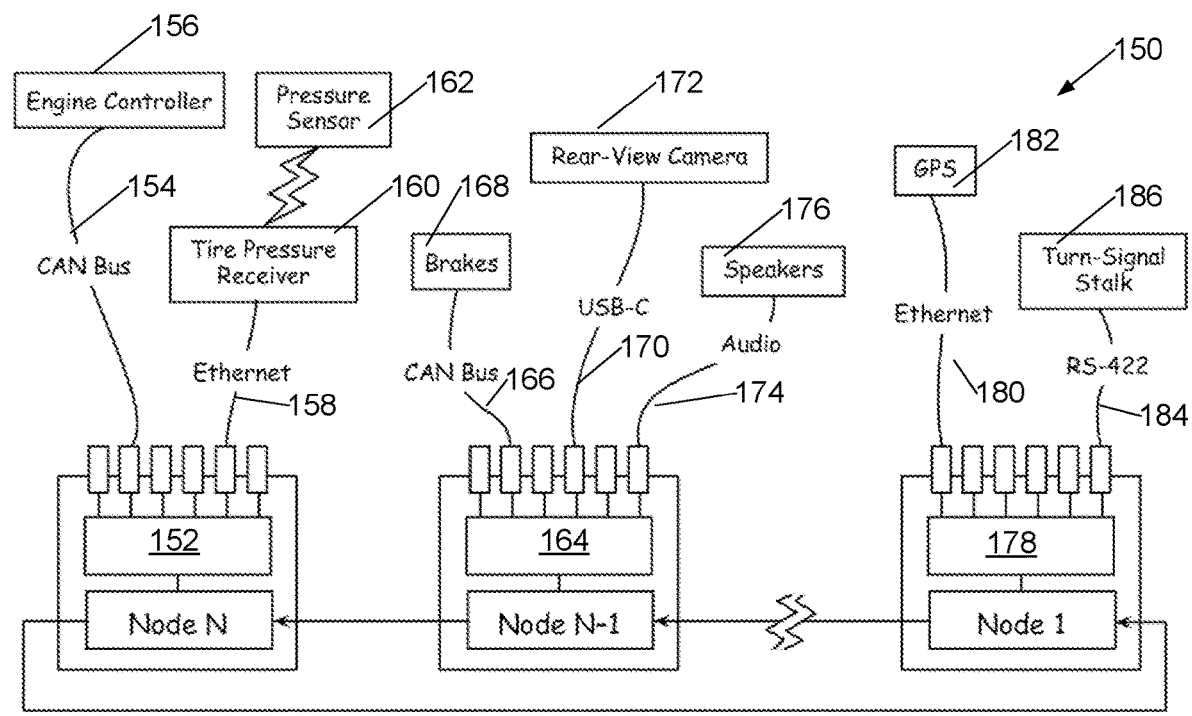
FIG. 1B is a block diagram illustrating a system application of the switch in an automotive application.

Switch 102 may be used in an automotive application 150 as illustrated in FIG. 1B. In this embodiment, node N's port management logic 152 interfaces through a Controller Area Network (CAN) bus 154 to an engine controller 156, and an Ethernet-style carrier-sensing multiple-access with collision detection (CSMA-CD) network 158 to a tire-pressure sensor receiver 160. Ethernet-style network 158 may also interface to an IEEE-802.11 compatible "Wi-Fi" transceiver (not shown) or a Bluetooth-compatible transceiver to provide connectivity for portable electronics. Similarly, node N–1's port management logic 164 may interface through a CAN bus 166 to a dynamic brake control module 168, and through a USB interface 170 to a rear-view camera 172. Node N–1's port management logic 164 may also interface through a digital audio bus 174 and digital-to-analog converters (not shown) to speakers 176. Similarly, a port management logic 178 of Node 1 may interface through an Ethernet-style network 180 to a GPS receiver 182 and a serial bus, such as an RS-422 interface 184, to a multifunction switch as often used with turn signals 186.

Interfacing devices through CAN, Ethernet, RS-422, or Wi-Fi as illustrated in FIG. 1B is intended for use with existing devices compatible with those bus schemes but is not mandatory; in some embodiments nodes of the switch may be built into modules such as a chassis computer module or a powertrain control computer module and communicate directly with components of that module.

Inter-Node Traffic

Traffic nominally travels in forward direction on the forward links 108, 109 (FIG. 1A) represented as outer links in FIG. 1. The reverse direction links 110, 111, illustrated as inner links in FIG. 1A, provide redundancy should a forward link 108, 109, or a node itself fail.

Figure 2B:
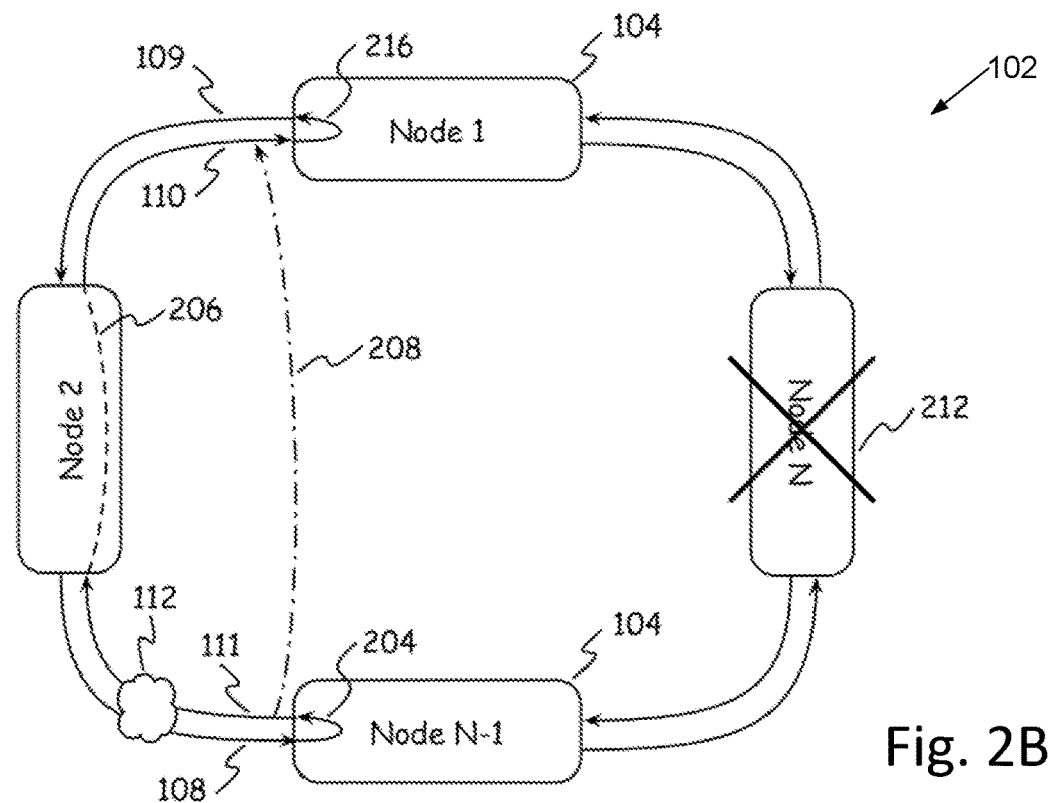
FIG. 2B shows recovery from a failed node.
Figure 2A:
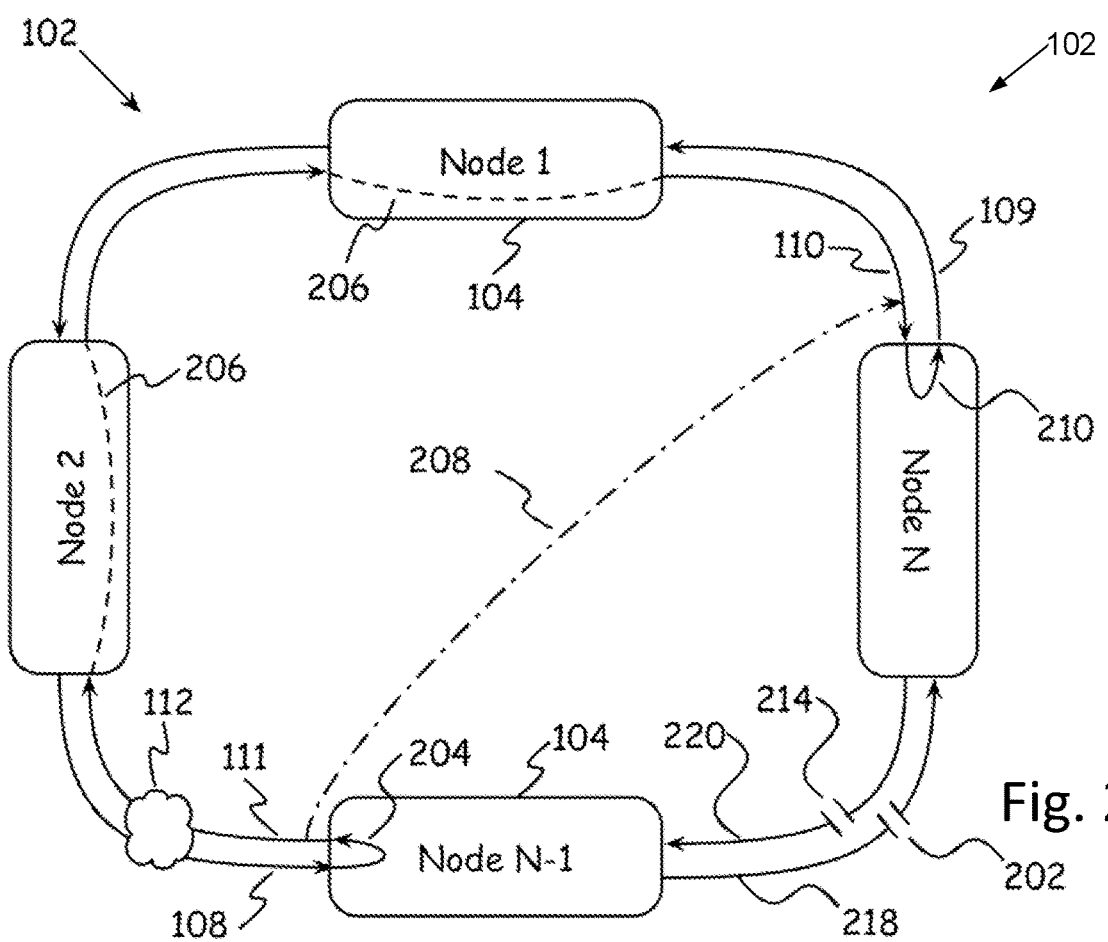
FIG. 2A shows recovery from a broken link.

Traffic flow may use the reverse links to replace or bypass a failed forward link 202 (FIG. 2A). When a broken link failure is detected, such as broken link 202, data transmission at the node upstream of the link failure (in this example, Node N–1) is reconfigured, 204, to transmit on the reverse link 111. The node downstream of the link failure (node) is reconfigured, 210, to accept transmissions on the reverse link. Data on the reverse links pass transparently through the intervening nodes 206, creating a virtual link 208 that replaces the failed link 202 from node N–1 to node N.

Traffic flow in the switch may also use the reverse links 110, 111 (FIG. 2B) to bypass a failed node 212 to create virtual link 208. If critical clients of a particular node are critical to system operation, a backup node, if provided and coupled to communicate with the critical clients, can be added to the ring and operated transparent to the ring traffic until needed to assume the function of the failed node.

Figure 3A:
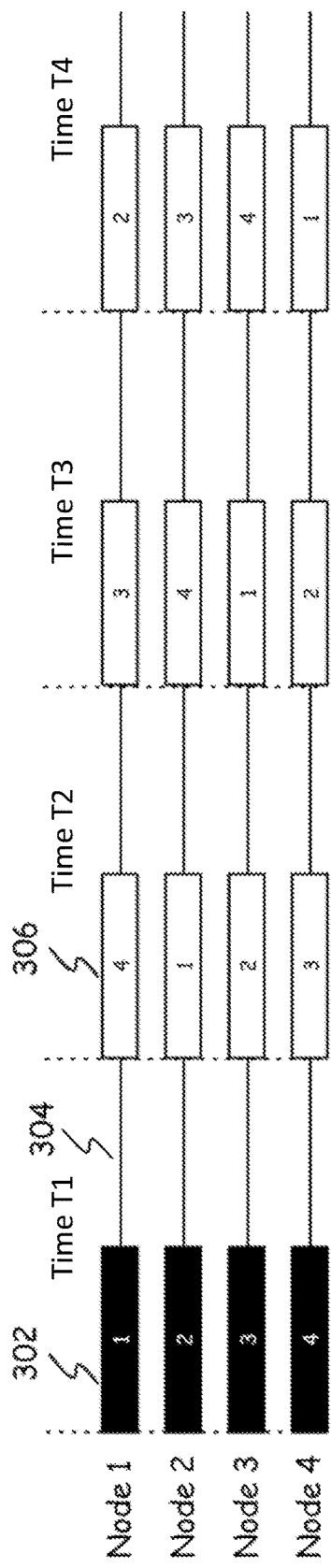
FIGS. 3A, B, C and D show alternative traffic profiles within the switch.
Figure 3B:
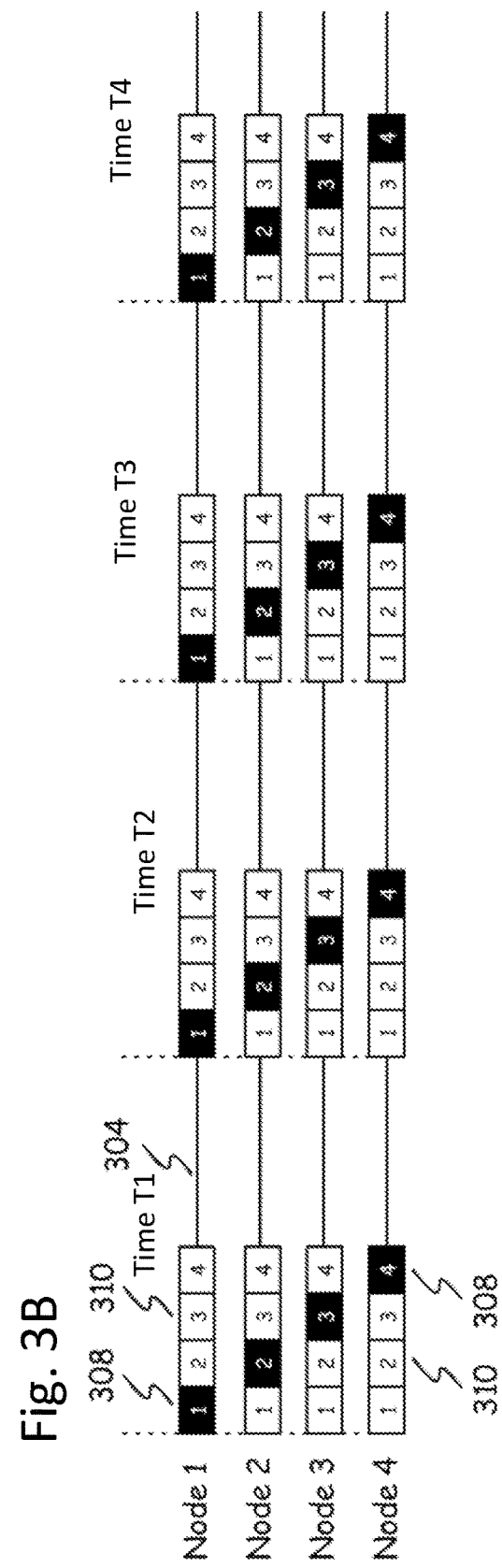
Figure 3C:
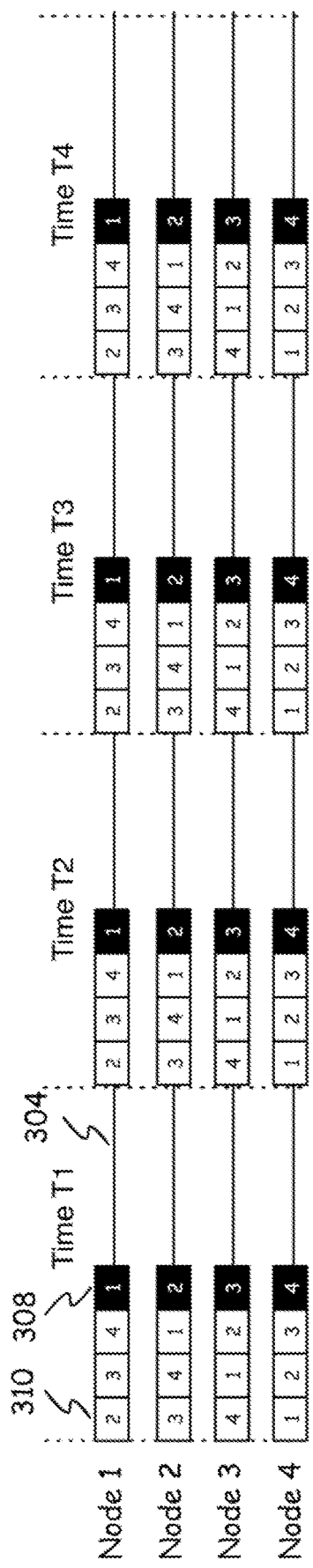
Figure 3D:
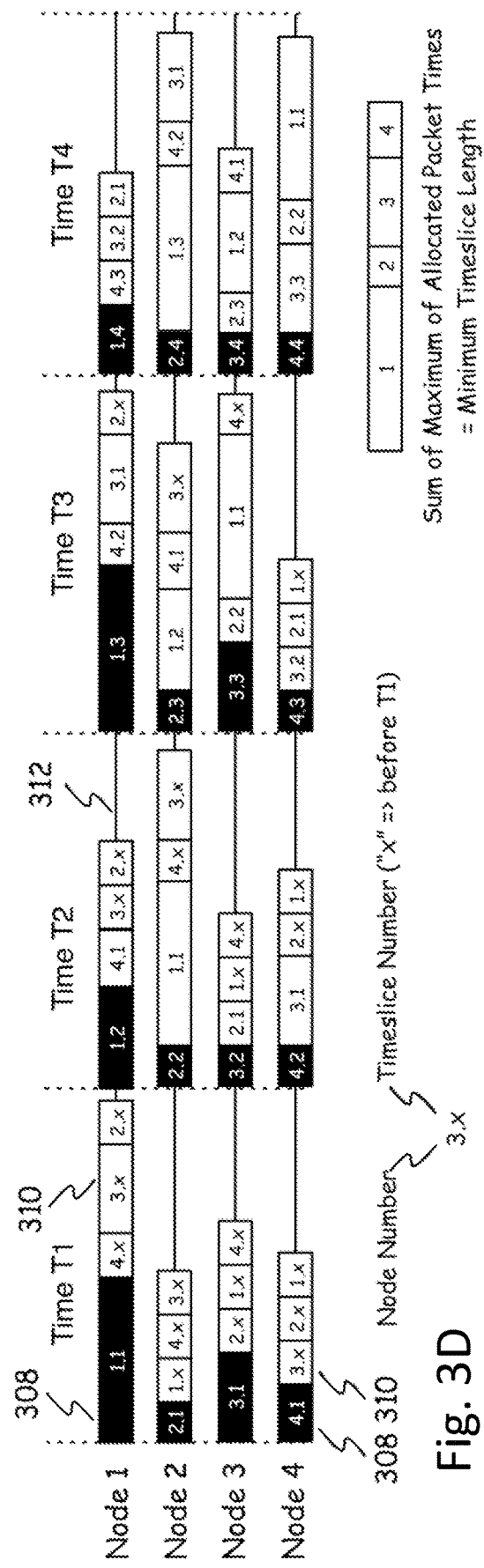

In steady-state operation, all nodes simultaneously initiate transmission of a data packet at the start of each equal-length switch-time interval such as Time T1, Time T2, Time T3, and Time T4 (FIGS. 3A, 3B, 3C). Each switch time interval is at least as long as, and in some embodiments longer than, a sum of maximum single-packet length durations allocated to each node, as illustrated in FIG. 3D. Data is transmitted by each node in a packet burst, in the embodiments illustrated in FIGS. 3B, 3C, and 3D packet burst includes packets from all nodes of the switch; each node forwards in the packet burst a packet from each other node of the switch, and may replace a packet it originated with a new data packet that may include switch control information and/or data originated from its clients.

In the embodiment illustrated in FIG. 3A, a single packet is transmitted by each node in each timeslice alternating between sending a new packet 302 that may include switch control information and/or data originated from its clients and relaying packets 306 originated by other nodes of the switch. In some embodiments, a dead time 304 may be appended after the packet burst to permit slow nodes to process and relay data.

In embodiments (FIGS. 3B, 3C & 3D) where each packet burst occupies a timeslice and includes packets both from a node (which may include data from its own clients or switch control information 308) and data received from upstream nodes 310. The data moves as though on a carousel where each node can update the data in its own allocated packet slot and may observe, as desired, data from other packets within the timeslice. When a node detects messages that it generated, it removes them from the circulation and replaces them with new messages (if any) from its clients. Each node observes all packets as they are passed around the ring, and extracts messages addressed to, or relevant to, its clients, while passing them on.

Several different packet transmission profiles are shown in FIGS. 3A vs. 3B/3C/3D. In FIG. 3A, all nodes transmit just messages from their own clients in interval T1. In the subsequent N–1 intervals the nodes simply relay what they have received. In FIGS. 3B, 3C & 3D, all nodes transmit in the packet burst a packet of their own in each time interval as well as relaying packets from other nodes.

The total of packets in a time interval form a packet burst.

FIGS. 3B and 3C show alternative orderings of node contributions to a packet burst. In FIG. 3B each node's contribution to the packet burst occur in the same order, regardless of which node is transmitting the packet. In FIG. 3C each node is shown as appending its packet to the end of the packet burst. The position of the contribution moves forward in the packet burst as the packet burst flows around the ring. When the node i receives a packet burst from its predecessor node, that packet always begins with the packet originated by node i in a previous transmission.

If a node has no client data or network control information to transmit, it outputs a minimum length NULL packet to provide proper synchronization around the switch.

The maximum packet burst length is a function of a data rate of the serial link and a length of the switch-time interval.

Delay associated with a packet traversing the ring depends on a several factors. In some embodiments incoming packets are fully buffered by one or more nodes to give it time to copy data from packets relevant to its clients and to insert data from its clients into its packet transmission. There may also be a quiescent period FIG. 3, 304, in each switch-time interval to provide time for nodes to process received messages and to assemble their client's messages for transmission. In such embodiments, packet delay around the ring is a function of the packet length, the quiescent period, the number of nodes in the ring, and time required to reroute packets because of failed nodes or links.

In other embodiments, packets are passed on while they are still being received, and there is no quiescent period. In this case, packet delay around the ring may be little greater than the packet transmission time plus delay time of wiring or optical fiber of the links. Delay around the ring in this embodiment, using the traffic profile shown in FIG. 3D, could approximate the switch-time interval. In this embodiment the delay around the ring is essentially independent of the number of nodes as each node adds only a few bit times.

In embodiments using timing as illustrated in FIG. 3A, if a client generates a message just after time T1, it may take as many as 2N−1 timeslices to reach a destination client on its immediate upstream node, but there are effectively N−1 time periods in which to process messages on the node. In embodiments using timing as illustrated in FIGS. 3B and 3C the maximum delay between generating client and the destination client is N+1 time intervals, but there is less contiguous time for processing the messages. In an embodiment, using the profile shown in FIG. 3D, total delay around the ring is about two switch-time periods. This occurs when the outgoing packets are queued for transmission just after the switch-time interval occurs, and waits until the next time interval to be sent. Ring traversal delay in this embodiment is sufficiently fast that, in practice, client-to-client delay will be dominated by packet processing on the originating and receiving nodes. The choice of timing depends on the characteristics of the system that the switch is supporting.

Node Structure and Operation

Figure 4A:
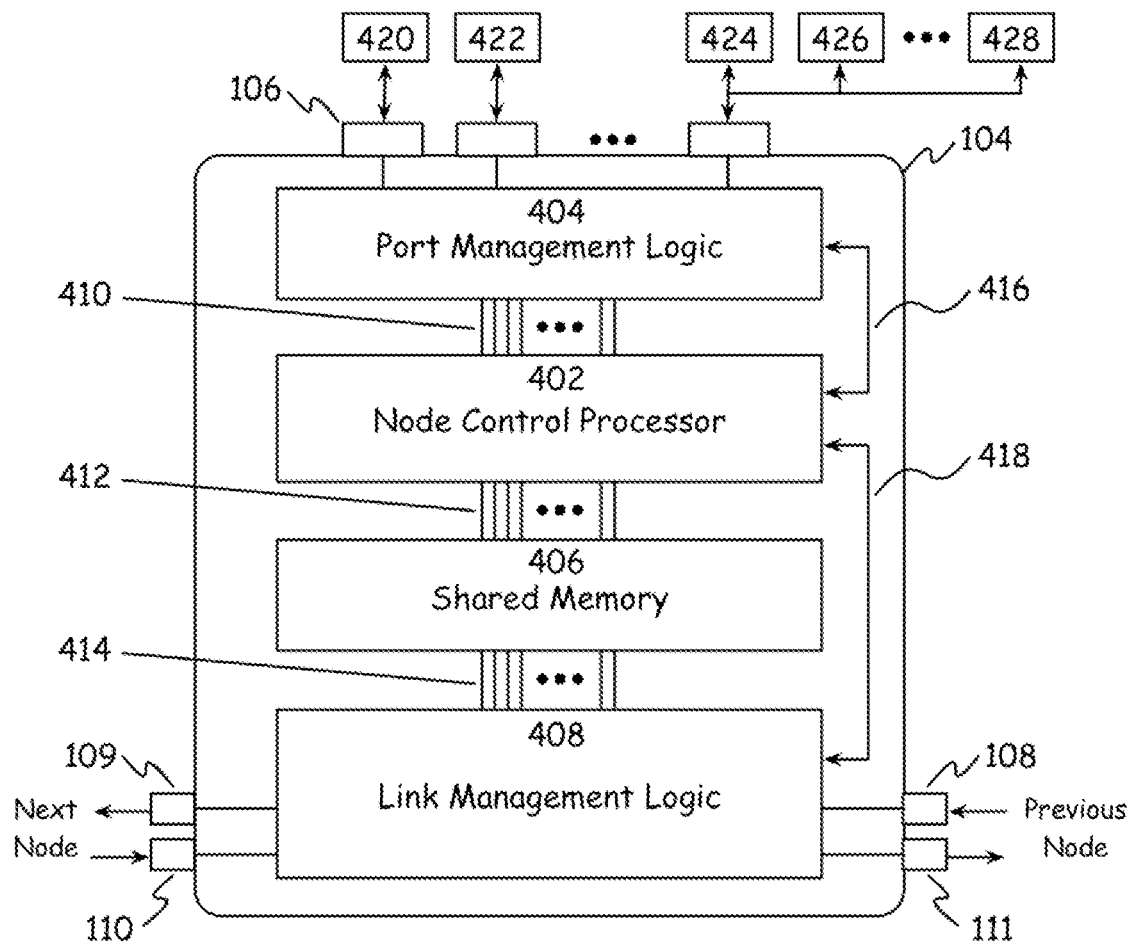
FIGS. 4A, B, and C are block diagrams illustrating a node of the switch marked to indicate various data paths through the node.
Figures 4B, 4C:
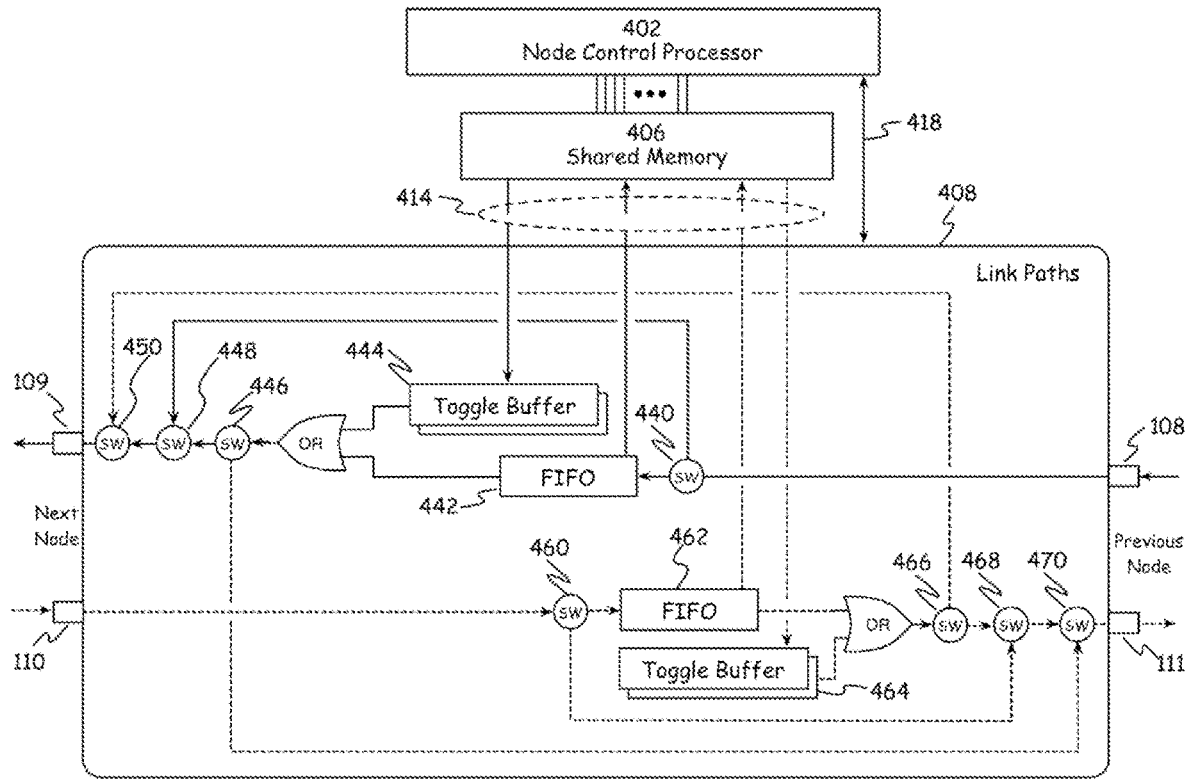
Figure 5A:
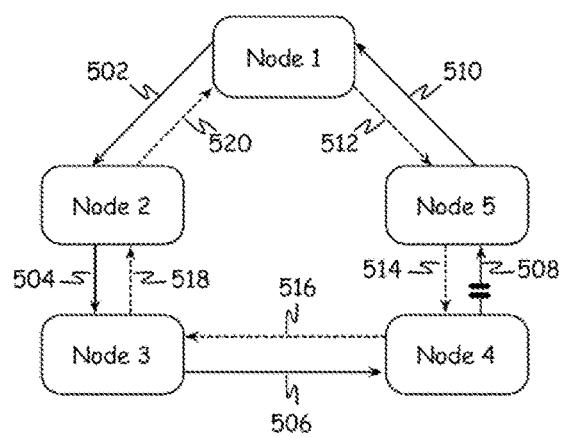
FIGS. 5A, 5B, 5C, and 5D illustrate potential single-point failure modes in the switch.
Figure 5B:
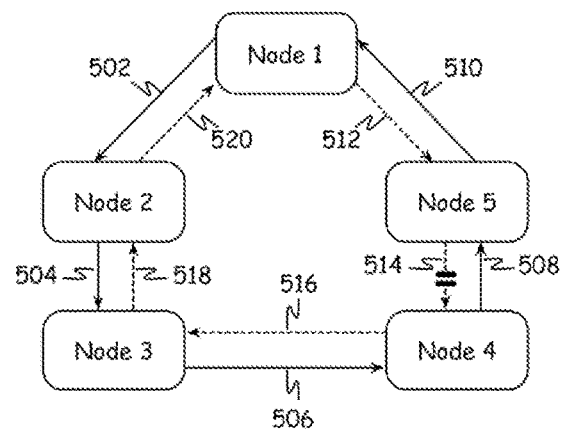
Figure 5C:
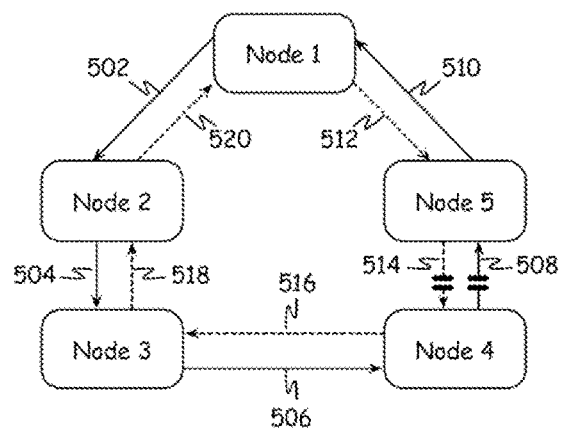
Figure 5D:
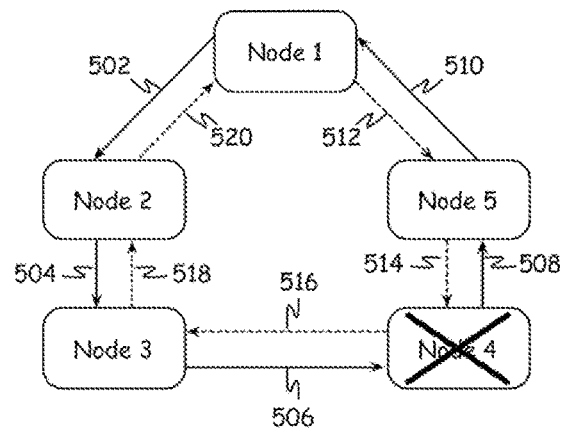

FIG. 4 shows the high-level details of a node 104 including its interfaces to other nodes in the ring and to clients. The Link Management Logic 408 is responsible for moving traffic on the two rings. In nominal operation it ingests incoming packets from the previous node link on forward link 108 and removes any own node information that it had previously sent out via link 109. Then it copies the rest of the packet to the shared memory 406 via 414.

A table in 408 specifies the subset of messages applicable to clients on the node. This table is accessible by the Link Management Logic. The table can be transferred to the Node Control Processor 402 via Shared Memory 406 in response to commands issued over 418. This table is set up when system is initially configured. It can be updated when the system is reconfigured (e.g., client elements 420-428 added or removed from the external ports 106), but all such updates must be digitally signed by a valid party to be accepted. The signature validation would generally be performed by the Node Control Processor 402 of the node that connects to an external access port (such as an OBD port on an automobile), but could be done on the node being updated to achieve additional security.

In embodiments where each packet within a packet burst may have variable length, nodes may buffer received data in a first-in, first-out (FIFO) buffer implemented in memory 406. Memory 406 may also hold a copy of a node's outgoing packet so that it may be compared to the same packet in a received packet burst to verify that the packet was correct at all nodes in the ring.

The maximum number of bytes in packet originated by each node, and the duration of the timeslice, is specified in node configuration tables in memory 406. The allocation is a function of the packets expected to originate at each node from its various clients. Nodes that originate very small packets that change infrequently do not need the same allocation as nodes that originate large amounts of data like video streams.

Nodes observe all data from packet bursts passing through them and can utilize that data in a manner defined by their internal configuration tables. For example, vehicle speed sensor data in a packet may be observed and used by a node coupled to a dashboard display, by a node coupled to a transmission controller, by a node coupled to a brake controller, by a node coupled to a cruise control, and by a vehicle speed limiting device.

Node Control Processor 402 performs several activities:

1 It extracts incoming data from received packets from its shared memory 406, via 412, unpacks data or messages from any associated metadata, and using that metadata and the configuration tables directs them via 410 to the Port Management Logic 404 which transfers them to clients using the client's native protocol. The Node Control Processor controls the Port Management Logic via control signals 416.

2 It ingests messages received from its own clients via the Port Management Logic 404 (which talks to clients using their native protocols) and, depending on the message applicability table, does either or both of the following:

a Packages the message with appropriate metadata as packets for transmission to the next node and places them into the Shared Memory, where, at the appropriate time, the Link Management Logic incorporates those messages into outbound packet burst sent to the next node in sequence; and b Where applicable, sends the message, via the Port Management Logic 404, to other clients on its own node.

Each client port 106 on the node is configured to support protocols used by its client or clients. When a single client 420, 422 is connected to a port then all its communications go through the node. If the port protocol supports a multiple client bus, such as an Ethernet style, USB, or CAN bus, those clients 424, 426, 428 may be able to communicate among themselves without interacting with the node. While such configurations are supportable by the node, they introduce security risks because the switch cannot completely mediate these interactions. The ability to support multiple clients on a single port can provide for more efficient connectivity without sacrificing security, if clients cannot be externally controlled so spoofing is not a possibility. An example of clients that cannot be externally controlled are simple sensors that do not interact with each other like temperature and speed sensors. Clients that can be manipulated from outside, such as an 802.11 or Bluetooth wireless link, should be uniquely connected to a port to maintain system security.

Contents of Packet Burst Sent Between Nodes

Each packet, and thus each packet burst, contains metadata indicating the source node, port, and message ID and communications protocol identifier for each message in the packet as well as a time or packet sequence when the transmitting node initiated packet transmission. In many embodiments, there is no node destination in the packet. That is because the device is a switch, not a network. Each node on the ring is configured to know what packets and what messages it needs to copy based on the source information.

Client-originated data is captured in raw form by the port control logic of the source node and delivered in that form to clients designated to receive that data that use the same communications protocol as the source client. If a designated receiver of that data uses a different communications protocol that the source client, the receiving node performs the protocol translation per its configuration tables.

Boot Up Self-Test, Error Identification, and Recovery

When a node powers on it executes a self-test procedure, first (1) testing its internal logic, (2) testing its interfaces to clients, and (3) testing its serial links (in both directions) to its adjacent nodes to verify proper operation of its own logic and its ability to talk to adjacent nodes in the ring.

Examples of single-point failures that may occur in a 4-node implementation of the switch are illustrated in FIGS. 5A, 5B, 5C, and 5D. In this group of figures, the forward ring includes links 502, 504, 506, 508, and 510; the reverse ring includes links 512, 514, 516, 518, and 520. Similar failures in 3 node switches, and switches of 5 or more nodes, are identified in similar manner to that described herein.

Figure 6:
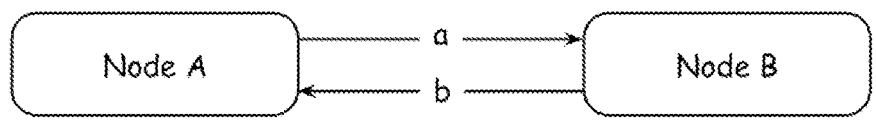
FIG. 6 illustrates use of a test packet to identify failure modes in the switch.

The knowledge obtained by a node from the exchange of test messages to adjacent nodes is enumerated in FIG. 6. This allows the node to configure itself into one of three operational modes:

1 A first (normal) mode where the node is configured to form a packet burst comprising a packet from the memory and at least one packet received through the forward link input and to pass that packet burst onward on its forward link output, or configured to form a packet burst comprising a packet from the memory and at least one packet received through the reverse link input and to pass that packet burst onward on its reverse link output.

2 A second (loop back) mode where the node is configured to form a packet burst comprising a packet from the memory and at least one packet received through the forward link input and to pass that packet burst onward on its reverse link output.

3 A third (loop forward) mode where the node is configured to form a packet burst comprising a packet from the memory and at least one packet received through the reverse link input and to pass that packet burst onward on its forward link output.

Figure 8A:
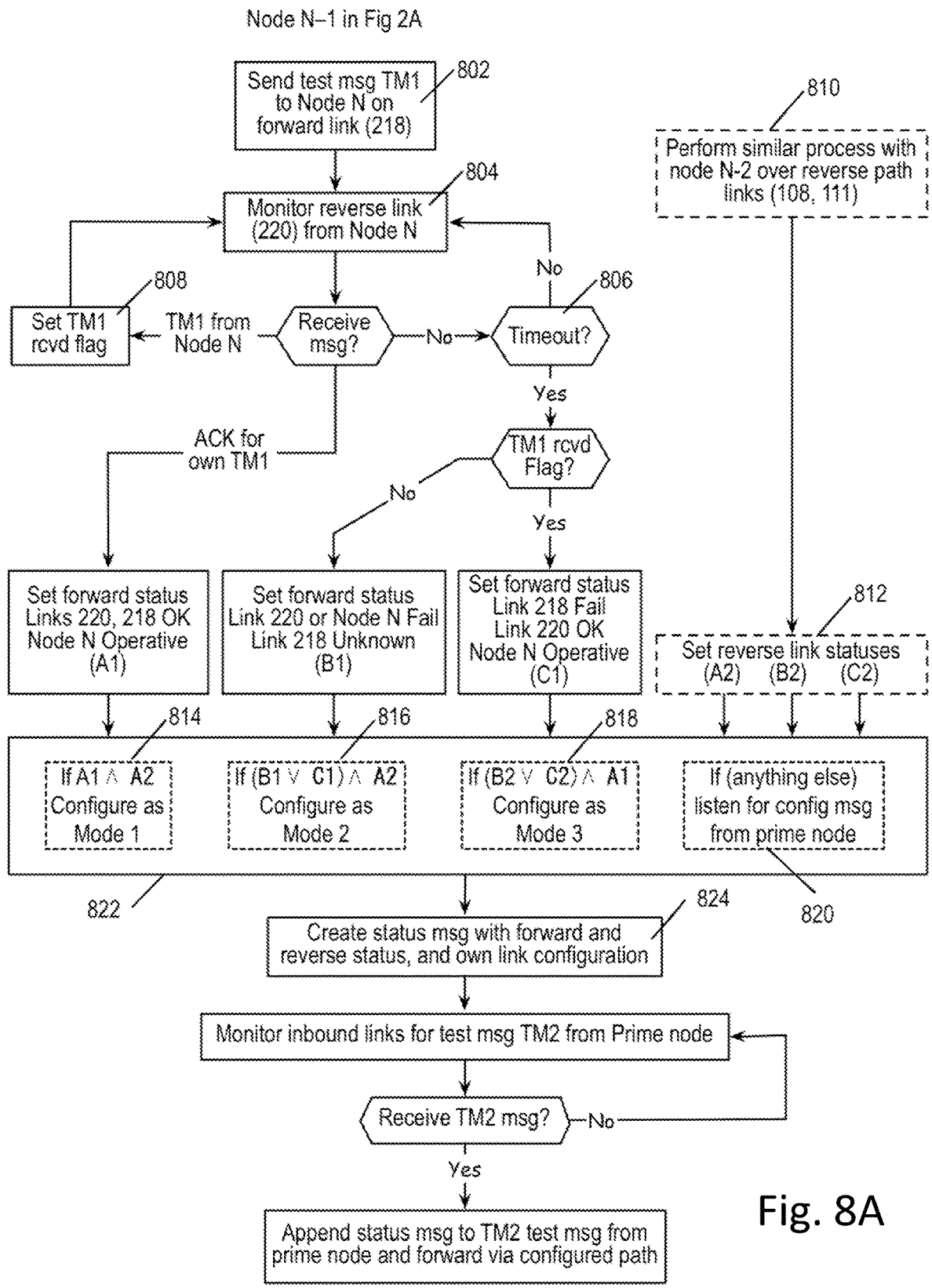
FIGS. 8A and 8B are flowcharts illustrating bootup self-test of the switch, including setting of initial loopbacks to work around dead links or dead nodes.

The test and configuration process is depicted in FIG. 8A from the perspective of node N−1. In the discussion "next node" refers to the node connected to the node's forward link output (node N), and "previous node" refers to the node connected to the node's forward link input (node N−2). The message exchanges with the next node and the previous node are initiated at the same time. FIG. 8A (from 802 to 822 where the configuration occurs) shows the details of the exchange logic with the next (node N). The exchange logic (810 and 812) with the previous node (N−2) is identical. The statuses determined from the message exchanges are fed into 822.

A node identifies failures by sending 802 (FIG. 8A) a first test message (TM1) to its adjacent nodes and waiting 804 for a reply from those nodes. Since nodes will not power up at exactly the same time, each node repeats the message 806 until it hears a response from the adjacent node or until a timeout occurs. From the sending node's perspective, if it hears no response it can't tell if the problem is one of the links to that adjacent node, or a failure of the adjacent node. If it hears a TM1 test message sent by the adjacent node it sets 808 an adjacent node TM1 message received flag. If it subsequently receives no acknowledgement for its outbound TM1 message, it knows that its own outbound link to that node has failed.

If the test packet sent to the next node on the forward link is properly acknowledged on the reverse link by the next node, and the test packet sent to the previous node on the reverse link is properly acknowledged on the forward link from the previous node then the link management logic is configured such that packets arriving via its forward input link are, after appropriate processing, passed on via its forward output link and packets arriving via its reverse input link are, after appropriate processing, passed on via its reverse output link. This configuration constitutes the first operational mode 814 (Mode 1).

If the test packet sent to the next node on the forward link is not properly acknowledged on the reverse link by the next node, and if the test packet sent on the reverse link to the previous node is properly acknowledged on the forward link by the previous node, the link management logic is configured such that packets arriving via its forward input link are, after appropriate processing, passed on via its reverse output link. This configuration constitutes the second operational mode 816 (Mode 2).

If the test packet sent to the previous node on the reverse link is not properly acknowledged on the forward link from the previous node, and if the test packet sent on the forward link to the next node is properly acknowledged on the reverse link by the next node, the link management logic is configured such that packets arriving via its reverse input link are, after appropriate processing, passed on via its forward output link. This configuration constitutes the third operational mode 818 (Mode 3).

Figure 8B:
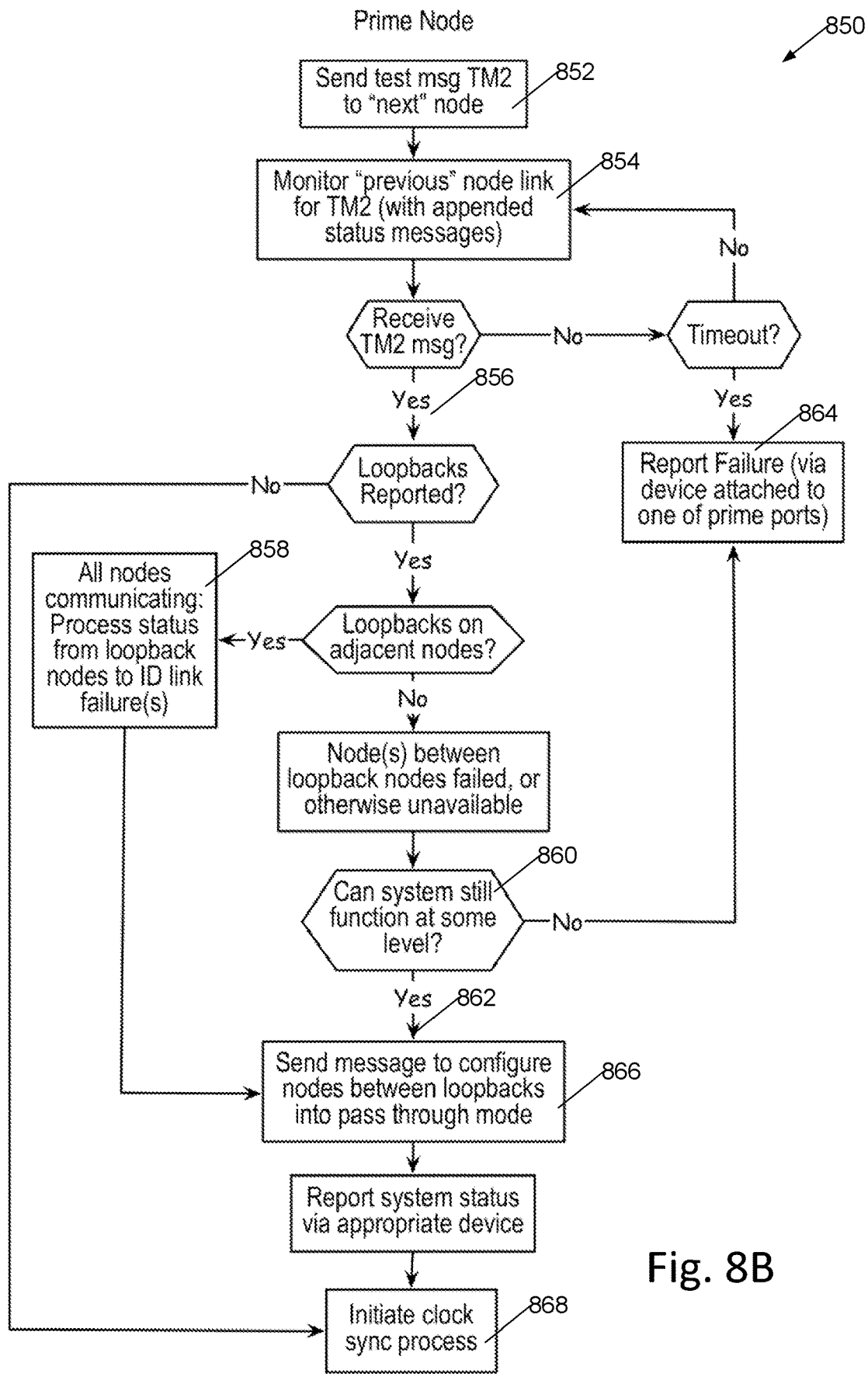

If a proper acknowledgement is not received from either adjacent node 820 the node listens on both input ports for a reconfiguration message from the prime node. The prime node may be able to determine, from the statuses of the loopback nodes acquired via the TM2 message 852 (FIG. 8B), whether there is a possible way to configure a continuous path through the ring.

In each of the three operational modes the node logic is configured to form a packet burst comprising a packet from the memory and at least one packet received through the operative input port. After the node clocks have been synchronized, packet bursts will be transmitted in a timeslice of predetermined duration over the operative output port.

If, at most, one link or link pair between two nodes has failed then the nodes' configurations will result in a single continuous path around the ring. Some part of that path may be on reverse links. The reverse link traffic is propagated as "Normal Reverse Traffic" FIG. 4C.

After a suitable time period to allow the inter-node exchanges and loopback reconfiguration (if required), a prime node (Node A) performs 850 a second stage configuration as follows:

1. The Prime node sends 852 a second type of test message, TM2 into the ring. It may be sent on the prime node's forward outbound link or the reverse outbound link depending on link status determined by the prime node's own TM1 exchanges. As that message packet propagates around the loop, each node adds its status information 824 (FIG. 8A) as an immediate subsequent packet in a packet burst which reflects that node's knowledge of the state of its links, and the general health of the node itself (The state of clients on the node is not a part of the switch boot operations and is determined after the node clocks have been synchronized.) The prime node monitors 854 its operative input link for the TM2 packet to return around the loop to it.
2. When the Prime node receives 856 the TM2 message packet on its inbound port it is accompanied in a packet burst with status information for each of the other nodes. It can ascertain where any loopbacks (configured according to FIG. 8A when the first test message TM1 was sent) are located, indicating whether any nodes have failed, or are otherwise non-reachable because they lie between multiple link failures. It also knows the general health of each reachable node. If loopbacks are configured on two adjacent nodes 858, all nodes are reachable, and system operation may be expected to be nearly normal. If there are unreachable nodes, then the prime node must make a decision 860 as to whether system operation 862 at a degraded level is possible given the now-known failures, whether the loopback nodes can be reconfigured so as to create a path through the ring, or whether a reboot attempt should be made. When loopbacks exist, a prime node may notify 864 users or set error flags accessible by system maintenance personnel.
3. If loopbacks have been created then the prime node may send 866 a configuration message that directs nodes between the loopbacks to go into the pass through mode on the reverse links to improve performance over default store-and-forward operation.
4. Clock synchronization is then performed.

Synchronization of Node Clocks to "Switch Time"

Clock synchronization occurs following the self-test and (re)configuration steps above. Each node contains a switch-time counter that the node uses to determine when to transmit its packets. When a node powers up this counter is set to zero. Since all nodes will not power up at exactly the same time it is necessary to synchronize their switch-time counter values. Also, since the clocks in those nodes will experience some drift over time it is necessary to maintain synchronization of those counters across the nodes over time. Messages are sent at a canonical time boundary (say when the M low-order bits of the switch-time counter are zero). Thus, the length of each transmission interval is defined by the value of bit M+1.

Initial synchronization is accomplished as follows:

The prime node begins transmission of a Time Sync message around the loop to, for example, Node 2 at its canonical time boundary. The message contains the high-order bits of its switch-time at the time the message is initiated. (Since the message is prepared before that bit rolls over, the value is computed as the current value of the M high-order bits plus one.)

Each node on the loop, such as Node 2, hardware captures the value of its own switch-time counter when the first bit of the message from node 1 appears. Node 2 compares the captured time to the canonical boundary value and adjusts the low order bits of its own switch-time counter so that it is in sync with Node 1 by adding or subtracting the difference. Then it sets the high order bits of its time counter to the value it received from Node 1.

Node 2 then prepares a message for Node 3 to be sent at Node 2's (adjusted) canonical time boundary. The high-order bits of the switch-time in this message will be the current value (received from node 1) plus one.

This continues until Node 1 receives a Time sync message from Node N. The time at which Node 1 sees the Time Sync message from Node N arrive should be less than a specified offset from the canonical time boundary.

Long-term synchronization is maintained on a continuous basis as follows:

A node begins transmitting a packet at the canonical window time according to its local switch-time clock. (The canonical window time is when a specified number of low order clock bits roll over to 0 . . . 0.)

A node marks the time that it receives the first bit of a packet from the previous node according to its local clock. When the node has received the entire packet, it adjusts its local switch-time clock by ½ of the difference between its view of canonical time and its previous node's view of canonical time (as noted when the first bit of the packet is received). For example, if the first bit of the packet from the previous node was received n ticks prior to its own view of the canonical time, it will advance its own clock by n/2 ticks; if the first bit of the packet from the previous node was received n ticks after its own view of the canonical time, it will retard its own clock by n/2 ticks.

This process causes the nodes to converge to a common value of switch-time (within a few bit times). Calculations indicate that once the clocks have been initially synchronized the above process is able to tolerate a significant drift of the local locks over a switch-time window and still maintain adequate synchronization. (The limit is driven by the unused time at the end of the window, where the clock adjustments would be made.) As a practical matter, oscillator drift over the window interval will never be more than a few bit times, so the adjustment at each node will never be more than a few clock ticks.

Error Handling During Operation

During Normal operation packet bursts move on the forward ring with the reverse ring used as an alternate path in the event of a link failure. When the system has no failures, a packet burst sent from Node A to Node B on the forward ring is acknowledged with a short acknowledgement on the reverse ring. This allows all links to be continuously checked for proper operation.

Figure 9:
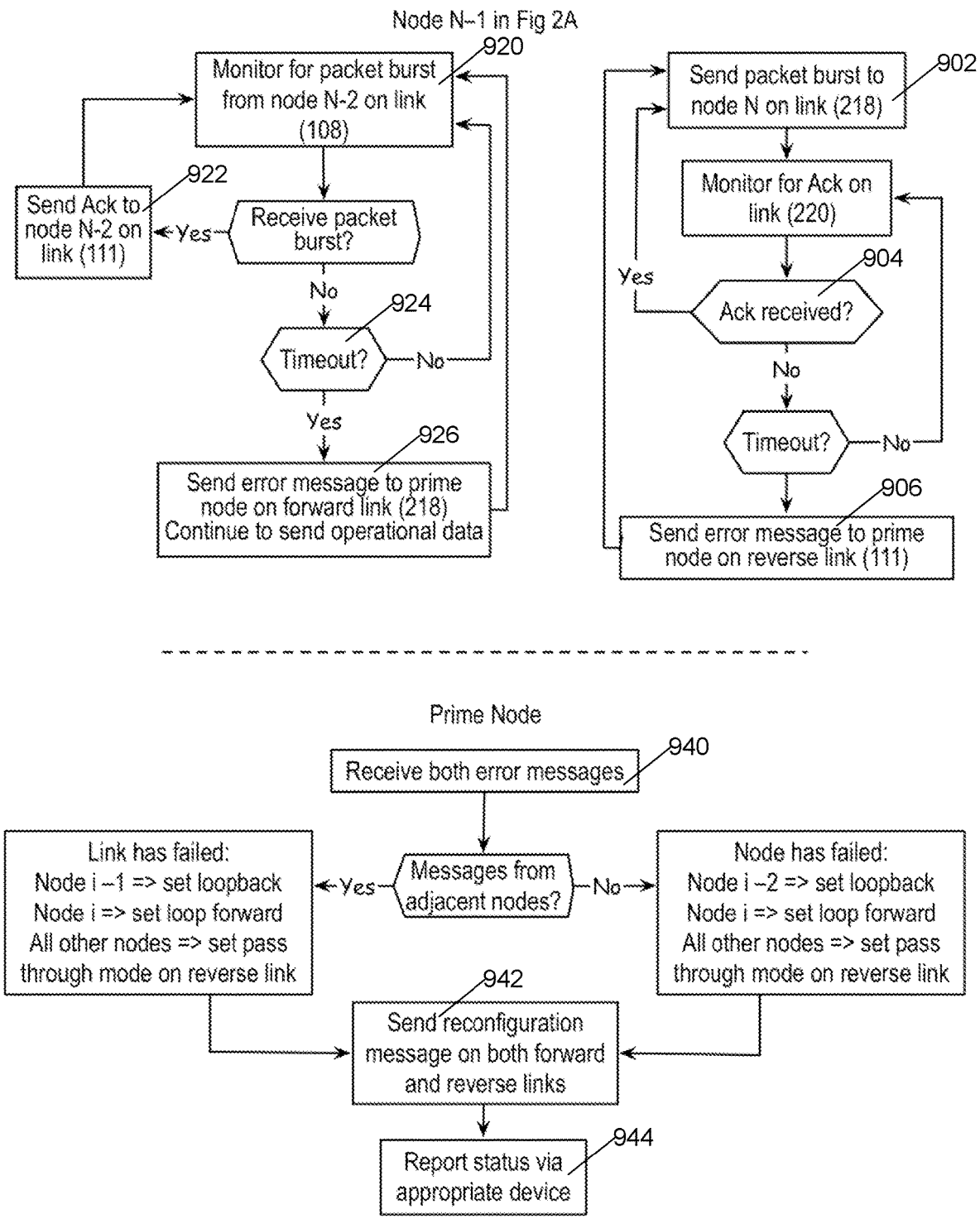
FIG. 9 is a flowchart showing failure detection and recovery during operation.

If a link sends a packet burst 902 but fails to receive an acknowledgement 904 (FIG. 9) it sends 906 an error message to the Prime node over the reverse ring.

Each node monitors 920 its inputs for packet burst. If a node receives a packet burst, it sends 922 an acknowledgment packet burst. If the node fails to receive a packet burst from its predecessor in the ring in less than a timeout interval 924, it sends 926 an error message to a designated Prime node as part of its next transmission.

When the prime node receives 940 one or both of these error messages, it can deduce the location of the problem and sends 942 reconfiguration messages (possibly in both directions) that cause the broken link, or link pair, to be bypassed as shown in FIGS. 2A, 2B. The prime node may also log the fault and set a "check engine" or equivalent warning light so maintenance personnel will download the fault log and repair the system.

Transparent Backup Nodes

Figure 7:
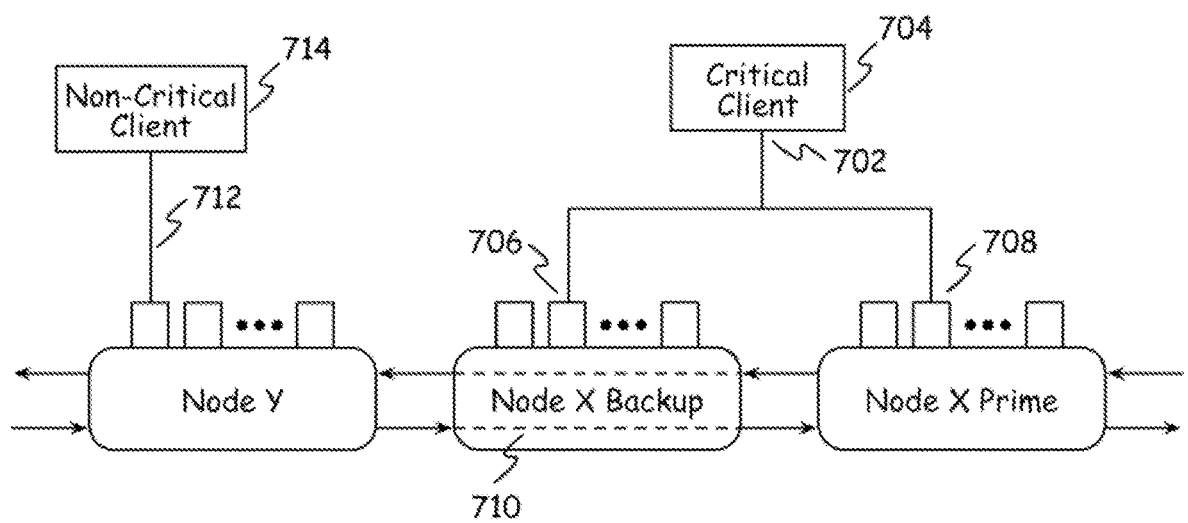
FIG. 7 shows redundant node mechanization.

In many applications, not all clients are operationally critical, for example in an automobile the entertainment system is not critical to control of the automobile, so if a node supports only clients of a such non-critical subsystem, then loss of that node may be an annoyance but not a dangerous one. On the other hand, a node supporting clients of the powertrain control subsystem or dynamic brakes is critical to safe system operation. One approach to making critical systems fail safe is to employ redundancy. In the automotive environment, where extant clients are generally connected to multi-drop buses (such as CAN bus), a backup to a critical node can be implemented as shown in FIG. 7. A node, such as Node Y, that supports a non-critical client 714 will generally be connected to that client via a point-to-point link 712 (even though the protocol used by that client supports a multi-drop bus.

We take advantage of the fact that clients in the automotive environment clients currently communicate over multi-drop buses. Thus, a critical client 704 can connect, via its normal interface, 702, to two switch nodes—via port 708 to a main node, and via port 706 to the backup node. It doesn't care whether its connection is point-to-point, or point-to-multipoint.

The main Node X and backup Node X work together as follows:

1 Main node X and backup Node X are configured similarly for operations on the local interface 702.
2 Main node X interchanges traffic with Node Y as though backup Node X were not there during normal operation, and main Node X provides support for client 704. The backup Node X neither creates nor processes normal link traffic in either direction. It simply acts to pass that traffic on with minimal delay 710. It does, however, accept configuration commands from the main node. In an alternative embodiment, backup node Y acts to interface to other devices while ignoring client 704.
3 When backup Node X detects no traffic from main Node X, or receives a control message indicating main Node X has failed or cannot communicate with client 704, it assumes the role of main Node X in communicating with client 704; client 704 need not be aware of the changeover.

Security

The services provided are typical of those for a managed switch, including the ability to create Virtual Private Networks (VPNs) among subsets of clients. These VPNs are defined by tables pre-loaded into each node indicating which messages they are allowed it to ingest and pass on to connected clients on specified ports. Further security can be achieved by encrypting and authenticating critical messages so that an adversary cannot extract or modify the contents of these messages. The switch can transparently bridge the native protocol between clients on different nodes. It can also be configured to translate protocols between unlike clients. The switch implementation provides a high level of security to otherwise insecure systems, because clients are identified by their physical connection to the switch so they cannot be impersonated by other (possibly compromised) clients in the system. The switch also has ability to authenticate firmware uploads, via a client such as an OBD connector or a wireless receiver, to any of the other clients in the system, an authentication that many extant clients cannot do for themselves).

When a single client is connected to a port the identification is unique: no other client can impersonate that client. If the port connects to a multi-drop bus, such as CAN bus, the clients on that bus could potentially impersonate one another if one of them were compromised. If these clients have no "back-side" communication link, then compromising such a client would require physical access to the client itself (not merely access to the OBD port)—the client cannot be modified via the switch without a digitally signed update. Generally, such a multi-drop situation would entail multiple sensors, or possibly a whole subsystem (sensors, computation, actuators). As long as there is no back-side communications link to any of the clients on the port, these elements are secure against anything but physical access and modification. This is a difficult attack vector, and cannot be done en masse. (We assume here, of course, that the attack has not occurred upstream in the logistics chain, so previously compromised clients have not been installed in the system.) Any client with a back-side communications potential, such as a tire pressure sensor Bluetooth receiver, or a wireless communications link would typically be the sole client on a node port so its communications can be isolated.

The switch can be configured and operated to provide some protection even against physical modifications to nodes. This entails (1) running the switch in a low-power, low packet rate mode, when the overall system that is not operating, and (2) providing on each node enough backup power to allow it to log loss-of-communications errors. Removing a node to replace it would trigger an interconnection failure on the ring, which could be logged and annunciated to a system operator when the overall system is turned on. Running the switch in a low power mode would be the normal case for a system like an automobile with a keyless entry system.

In addition, in the low power mode, nodes could be configured to communicate at a low rate with the critical clients that retain backup power, whether in regular or low-power mode, when the overall system is off; the switch can then detect whether such clients have been disconnected from the node.

Clients with a back-side communications potential could be compromised from that direction, but such a compromise could not be propagated through the switch to other clients in the system.

In addition, the packets flowing between the nodes could be cryptographically authenticated using efficient methods (such as keyed-Hash Message Authentication Code) to detect physical attacks on the system, such as swapping out a node with a maliciously configured copy.

Asynchronous Transmission Profiles

The switch as described above has all nodes initiating transmissions simultaneously on a synchronous schedule. Other data transfer profiles are possible. For example, a node could transmit a client message at its first opportunity (immediately, or if a relay of a packet burst from the previous node is underway, when that relay transmission has completed). Such opportunistic transmissions could potentially reduce the transfer delay from message initiation by a first client to message arrival at a second client.

In the synchronous case, a node would always send some packet at each switch-time interval (although that packet may be a NULL packet if the node had no client messages to send) In the asynchronous case nothing is sent if there are no client messages to send or to relay. In very lightly loaded situations such as system OFF or in standby this may save some energy.

Any delay and power reduction advantages of the asynchronous case are realized only when traffic through the switch is low compared to the link transmission speed. In situations with control loops that run at high rates, and with video transmissions, these advantages are negligible. Furthermore, link management logic that operates in an asynchronous manner is likely to be more complex than the logic required for the synchronous case, and at high traffic loads asynchronous operation may affect the stability of the carousel.

The switch includes data transmission profiles that operates as a carousel, i.e., where (1) client messages that originate on a first node are relayed around the ring until they return to that first node where they are removed; (2) client messages are consumed by one or more second nodes, per configuration data on those second nodes, (3) all links in the ring can potentially be active at the same time.

Advantages of the Switch Over Other Distributed Switch and Network Approaches

1 Other "communications" architectures that use a ring configuration (either single or double) such as token ring or FDDI all rely on passing a token to gain media access for message transmission. They are structured to provide asynchronous access to the media and to support messages of arbitrary length. In some cases, multiple conversations can occur simultaneously if the pairs of nodes do not overlap each other, but these are ad hoc situations. As a result, the protocols are quite complicated.

The current switch differs from these other approaches in that:

a It can operate synchronously or asynchronously;
b There is no token or other mechanism required for media access—transmissions from nodes all occur at the same times in the synchronous case and when appropriate in the asynchronous case;
c The ring of nodes behaves like a carousel—all messages pass every node where they may be copied, but they are only deleted by the originating node after they have been seen by all other nodes;
d In synchronous mode, all links transmit a packet in every transmission window, so the total bandwidth across the switch is on the order of the bandwidth of each link times the number of links;
e Although the system is physically a ring, it operates not as a network, but as a switch, with the links constituting the switch fabric;
f Each deployment of the switch is configured to support a defined system, such as an automobile network, not a system such as an office network that can grow dynamically to become arbitrarily large, so capacity will always be sufficient to support system operation; and
g Transmissions can be verified by the value of node's own output to the value of that it receives when that output has traversed the ring.

2 For many applications, packets need not contain destination addresses because destination information may be a function of switch configuration.

3 The system can provide the functionality and security afforded by a managed switch, but unlike other managed switch products, the ports of the invention can be physically distributed proximate to the various clients, obviating long wire runs from client to port.
4 The switch replaces existing buses and networks by transparently bridging the native protocols of the various clients in the system, whether those protocols are "like" or "different".
5 The switch provides firmware update security for its own node configurations and to clients that do not, or cannot, provide it for themselves.
6 The switch provides a mechanism for placing a dormant backup element in-line in the ring, and for activating such an element in the event of a failure of its prime counterpart.
7 The switch can detect and log some physical disconnection of some of its components to detect some physical attacks.

Changes may be made in the above system, methods or device without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A first node for a ring-based switch comprising:
a processor;
a link management logic coupled to the processor and comprising a forward link output adapted to couple to a forward link input of a second node, a reverse link output adapted to couple to a reverse link input of a third node, a forward link input adapted to couple to a forward link output of the third node, and a reverse link input adapted to couple to a reverse link output of the second node;
a memory coupled to the processor and to the link management logic;
the link management logic is configurable in a first operational mode where the first node forms a packet burst comprising a packet from the memory and at least one packet received through the forward link input and transmits that packet burst on its forward link output;
the link management logic is configurable in a second operational mode where the first node forms a packet burst comprising a packet from the memory and at least one packet received through the forward link input and transmits that packet burst on its reverse link output;
the link management logic is configurable in a third operational mode where the first node forms a packet burst comprising a packet from the memory and at least one packet received through the reverse link input and transmits that packet burst on its forward link output;
where the first node is configured to, after power-on, repetitively transmit a first test packet over the forward link output and, if no acknowledgment is received over the reverse link input within a predetermined test-time interval, the link management logic is configured in the second operational mode; and
where, if the first node is configured to transmit a second test packet over the reverse link output, and if no acknowledgement is received over the forward link input within the predetermined test-time interval, the link management logic is configured in the third operational mode; and where, if the first node receives acknowledgement on the reverse link input of the first test packet, and receives acknowledgement on the forward link input of the second test packet, the link management logic is configured in the first operational mode.

2. The first node of claim 1 wherein the link management logic is configurable to receive a packet burst and to replace a packet of the packet burst originated by the first node with another packet from the memory.

3. The first node of claim 2 wherein the link management logic is configurable such that the packet from the memory and the at least one packet received on a link selected from the forward link input and the reverse link input and assembled into the packet burst are configurable to be of different sizes.

4. The first node of claim 1 further comprising a port management logic adapted to interface to a plurality of clients.

5. The first node of claim 4 wherein the port management logic is configurable to interface the first node to a bus selected from a carrier-sense multiple-access collision-detect (CSMA-CD) bus, a Controller Area Network (CAN) bus, and a Universal Serial Bus (USB).

6. The first node of claim 5 wherein the port management logic is configurable to interface the first node to an Ethernet-type CSMA-CD bus.

7. The first node of claim 2 wherein the forward link output is configured to couple to the second node through a twisted pair, and where the forward link input incorporates a differential receiver.

8. The first node of claim 1 wherein the first node is configured to respond to a packet burst comprising a second test message by transmitting a packet burst comprising the second test message and a status of the first node.

9. A system comprising a first node, a second node, and a third node for a link-based switch, where each of the first node, the second node, and the third node are a node comprising:
 a processor,
 a link management logic coupled to the processor and comprising a forward link output, a reverse link output a forward link input, and a reverse link input, and
 a memory coupled to the processor and to the link management logic,
 the link management logic is configurable in a first operational mode where the node forms a packet burst comprising a packet from the memory and at least one packet received through the forward link input and transmits that packet burst on its forward link output,
 the link management logic is configurable in a second operational mode where the node forms a packet burst comprising a packet from the memory and at least one packet received through the forward link input and passes that packet burst on its reverse link output,
 the link management logic is configurable in a third operational mode where the node forms a packet burst comprising a packet from the memory and at least one packet received through the reverse link input and passes that packet burst on its forward link output, and
 a client interface logic,
 where the node is configured to, after power-on, repetitively transmit a first test packet over the forward link output and, if no acknowledgment is received over the reverse link input within a predetermined test-time, configure the link management logic in the second operational mode, where, if the node is configured to transmit a second test packet over the reverse link output, and if no acknowledgement is received over the forward link input within the predetermined test-time, the link management logic is configured in the third operational mode, and where, if the node receives acknowledgement on the reverse link input of the first test packet, and receives acknowledgement on the forward link input of the second test packet, the link management logic is configured in the first operational mode;

where the forward link output of the first node is coupled to the forward link input of the second node, and the forward link output of the second node is coupled to the forward link input of the third node; and where the reverse link output of the third node is coupled to the reverse link input of the second node, and the reverse link output of the second node is coupled to the reverse link input of the first node.

10. The system of claim 9 wherein, if all three nodes are configured in the first operational mode, packet bursts are transmitted through the forward link outputs of the first node, the second node, and the third node at regular intervals.

11. The system of claim 10 wherein each packet burst comprises a packet originated by each of the first node, the second node, and the third node.

12. The system of claim 11 wherein each of the first node, the second node, and the third node is assigned a different maximum length for packets originated by that node.

13. The system of claim 12 wherein the first node is designated as a prime node, and wherein the prime node sends a third test message packet to which, while forming a packet burst, the second and third nodes each append a packet comprising their own node status.

14. The system of claim 13 wherein the first node designated as the prime node sends a time synchronization message packet, and the second and third nodes adjust an internal packet-burst timer upon receipt of the time synchronization message packet.

15. The system of claim 14 wherein the second and third nodes are configured to maintain synchronization of their internal packet-burst timers based upon time of receipt of initial bits of packet bursts.

16. The system of claim 13 wherein the prime node is configured to report link failure and unreachable-node failures after receiving the packets comprising node status from the second and third nodes.

17. The system of claim 13 wherein the second node and the third node are both coupled to a same multidrop bus selected from a carrier-sense multiple-access collision-detect (CSMA-CD) bus, a Controller Area Network (CAN) bus, and a Universal Serial Bus (USB);
 where the prime node designates a node selected from the group consisting of the second node and the third node as a master node for the same multidrop bus;
 where a node selected from the group consisting of the second node and the third node that is not the master node for the same multidrop bus is designated as a backup node;
 and where, should a failure of the master node for the same multidrop bus is detected, the backup node is redesignated by the prime node as a master node for the same multidrop bus.

18. The system of claim 9 wherein at least one of the first, second, and third node have a port management logic adapted to interface to a plurality of devices.

19. The system of claim 9 wherein a node selected from the first, second, and third node is configured to verify a correct digital signature on firmware updates addressed to a device coupled to a node selected from the first, second, and third node.

20. The system of claim 12 wherein packet bursts are transmitted by nodes at regular intervals greater than or equal to a sum of maximum transmission times of packets as determined from the maximum length of packets for all nodes of the system.

\* \* \* \* \*